United States Patent [19]
Herman et al.

[11] 3,824,913
[45] July 23, 1974

[54] APPARATUS FOR CLEANING BREW HEAD SCREEN

[75] Inventors: David Herman, Livingston, N.J.; Sidney J. Friedman, New York, N.Y.

[73] Assignee: Coffee-Mat Corporation, Kenilworth, N.J.

[22] Filed: Apr. 16, 1973

[21] Appl. No.: 351,238

[52] U.S. Cl. .................................................. 99/298
[51] Int. Cl. ............................................. A47j 31/00
[58] Field of Search ............ 99/287, 297, 302, 323, 99/295, 289, 279, 298

[56] References Cited
UNITED STATES PATENTS

| | | | |
|---|---|---|---|
| 3,120,440 | 2/1964 | Ross | 99/298 |
| 3,221,637 | 12/1965 | Small | 99/283 |
| 3,349,690 | 10/1967 | Heier | 99/298 |
| 3,369,478 | 2/1968 | Black | 99/289 |

*Primary Examiner*—Robert W. Jenkins
*Attorney, Agent, or Firm*—William R. Liberman, Esq.

[57] ABSTRACT

A single-cup coffee brewing assembly includes a brew cup which is moved from an inverted depressed position to a raised upright position, and is connected to a metered source of hot water. A cover member advances longitudinally into registry with the brew cup which engages the advanced cover upon the brew cup reaching its raised position. The cover has a bottom metal screen which is cleaned with the cover advancing and retracting movement by passing over a transversely extending helically wound brush. The brush is upwardly spring-biased and is replaceable in a support bracket which is releasably mounted in the assembly frame. The cover has a chamber above the screen which is connected to the brew discharge.

13 Claims, 10 Drawing Figures

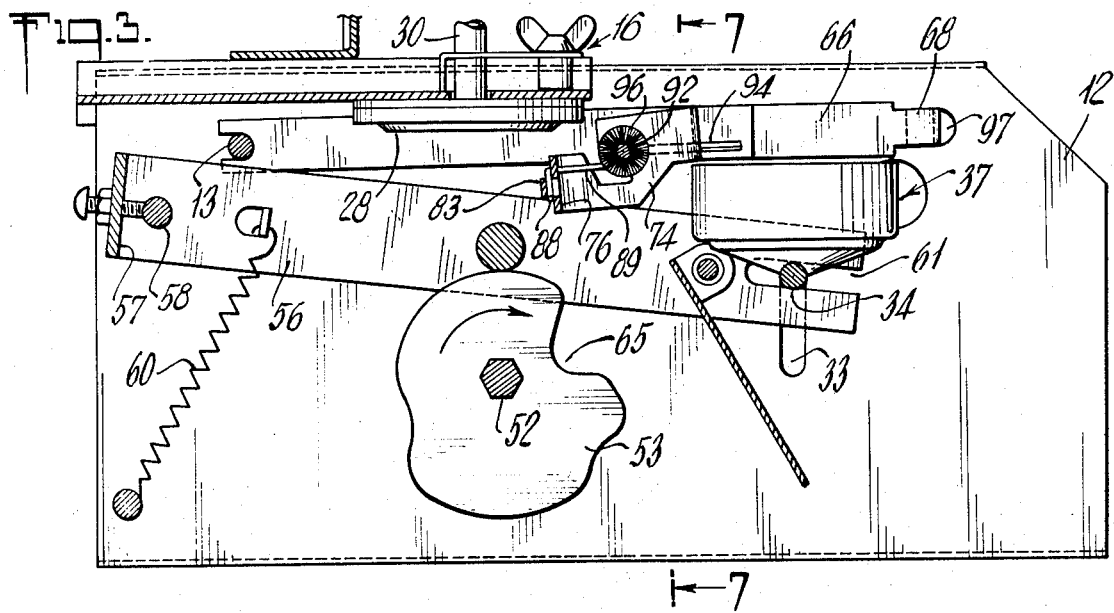
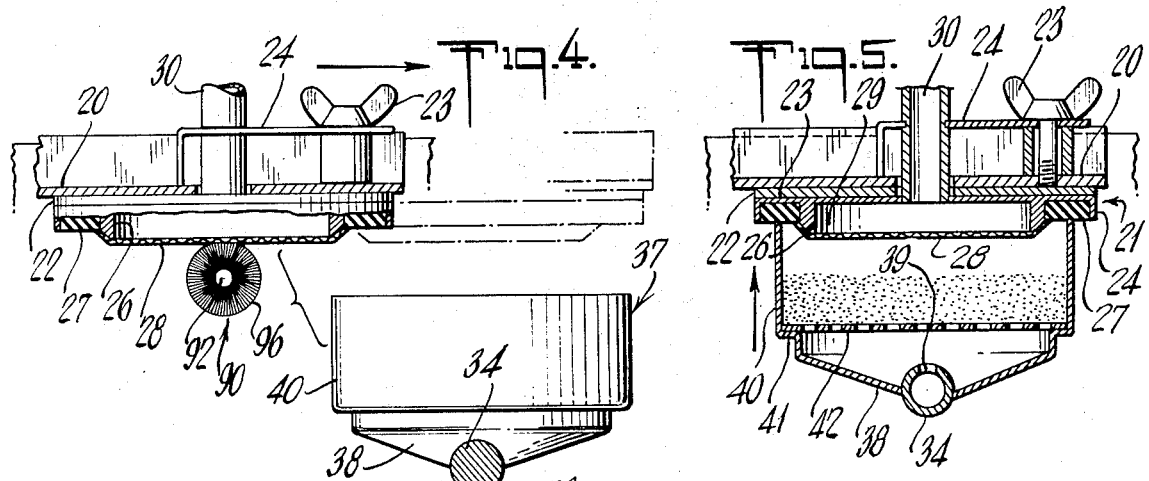
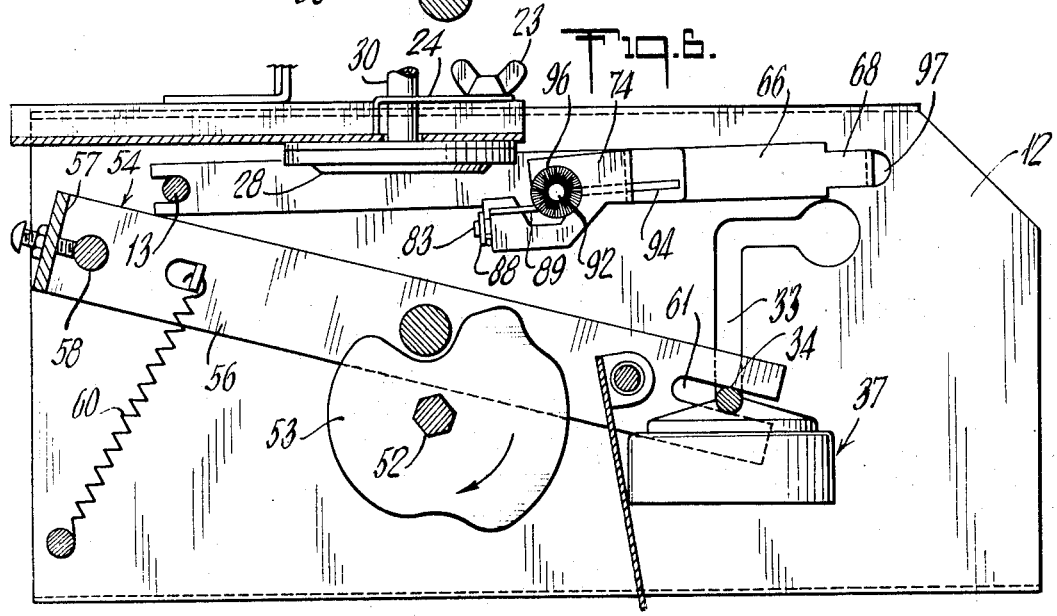

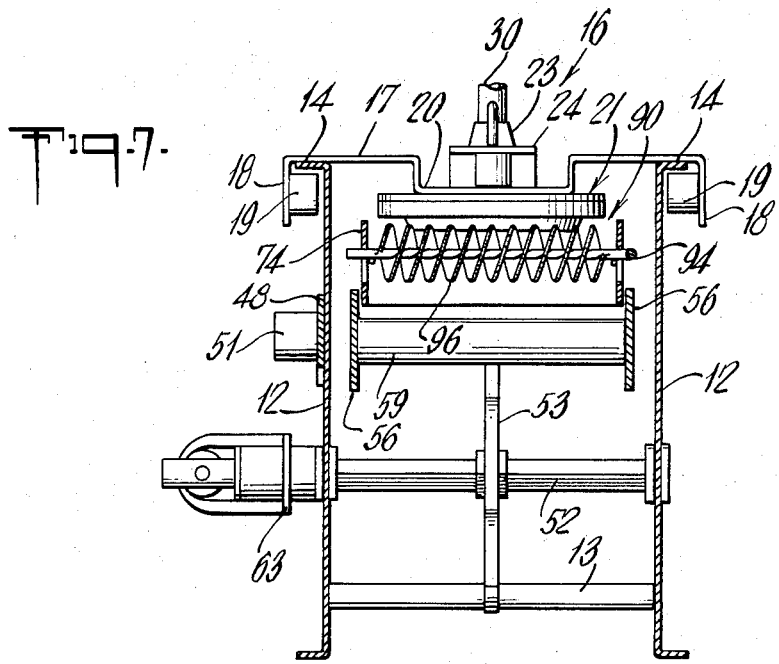
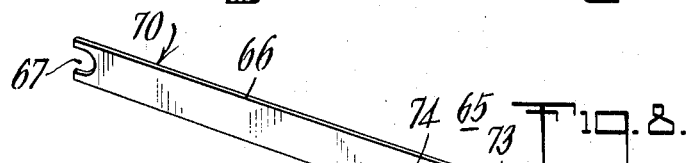
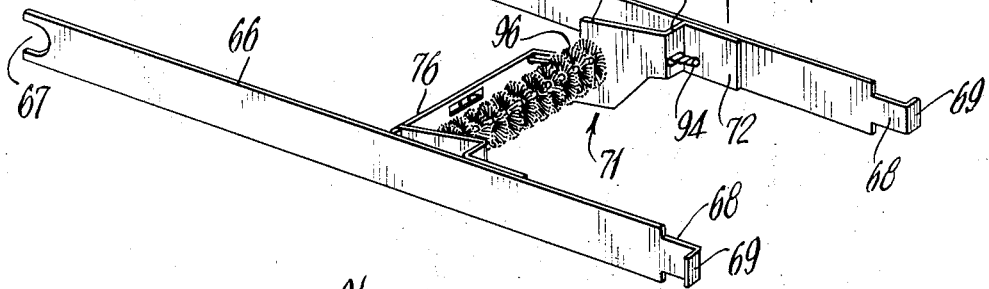
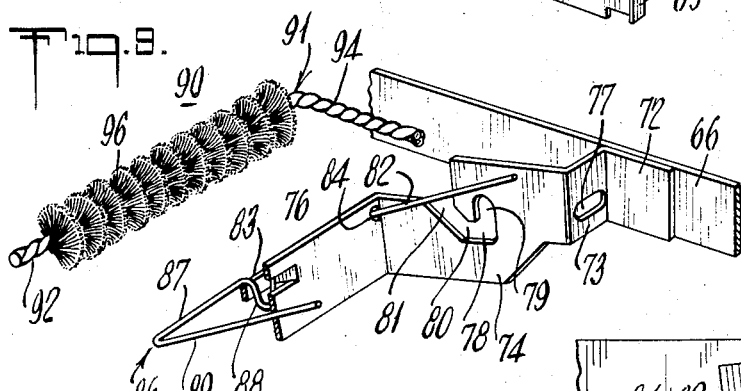
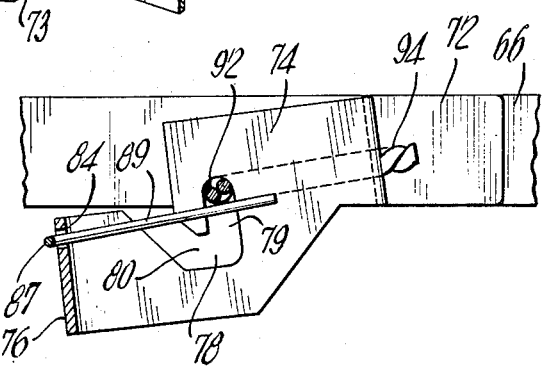

APPARATUS FOR CLEANING BREW HEAD SCREEN

BACKGROUND OF THE INVENTION

The present invention relates generally to improvements in brewing devices, and it relates particularly to an improved single-cup coffee brewing assembly.

There are many types of brewing machines which are available or which have been proposed for the automatic brewing and dispensing of an individually brewed single cup of coffee, but these have possessed numerous drawbacks. An automatic single-cup coffee brewing and dispensing machine which has been highly satisfactory is that described in U.S. Pat. No. 3,221,637, granted to Sollie W. Small and David Herman. In the machine of this patent there is provided a single-cup brewing assembly which includes a brew cup movable between a retracted, depressed inverted position and a raised upright position, a cover member longitudinally movable between a retracted position and an advanced position in registry with the raised brew cup, a device for delivering a pre-measured amount of ground coffee to the raised brew cup, and a filter paper dispensing assembly for applying a sheet of filter paper to the raised brew cup. A brewing cycle drive mechanism automatically successively raises the empty brew cup, deposits ground coffee therein, applies a sheet of filter paper thereon, advances the cover into registry with the brew cup, raises the brew cup into hermetic engagement with the cover, meters hot water through the brew cup, filter paper, and cover to a discharge spout, rapidly lowers and inverts the brew cup to discharge the filter paper and coffee grounds and retracts the cover to complete the cycle. While the aforesaid machine operates quite satisfactorily, it possesses an important drawback. The use of a sheet of filter paper for each cup of brewed coffee is an added significant expense, and the cost of maintaining and servicing the machine is appreciably increased by reason of the filter paper dispensing mechanism, which required frequent attention and paper replacement. Moreover, the filter paper applying mechanism is, in itself, complicated and costly and its use in the system accounts for an appreciable part of the cost thereof, quite apart from the problems with maintainance and replacement. Many attempts have been made in the past to avoid the use of filter paper, but heretofore these have proven relatively unsuccessful and have introduced further complications into the construction and operation of the brew machines.

SUMMARY OF THE INVENTION

It is a principal object of the present invention to provide an improved brewing device.

Another object of the present invention is to provide an improved single-cup of coffee brewing device.

Still another object of the present invention is to provide an improved automatic single-cup coffee brewing device employing a ground coffee and obviating the use of disposable filter elements such as sheets of filter paper.

A further object of the present invention is to provide a single-cup coffee brewing device of the above nature characterized by its simplicity, ruggedness, reliability in operation, ease of service and maintenance, and which is readily adaptable to existing single-cup coffee brewing dispensing machines.

It has been found that the employment of individual disposable filter paper for each single-cup brewing cycle in the brewing machine described in the above-mentioned U.S. Pat. No. 3,221,637 may be obviated by providing a permanent filter screen formed of metal wire or the like attached to the bottom face of the brew cup cover and a transversely extending helically wound brush located below the cover but projecting above the level of the screen, and so positioned that with the reciprocation of the cover between its advanced and retracted positions the full face of the screen travels across the brush. By this simple expedient, the screen is thoroughly cleaned during each brewing cycle, and clogging thereof is prevented, and by the application of the brush, as will hereinafter be described, to the brewing assembly of the subject type other complex mechanisms may be eliminated with their accompanying difficulties along with the necessity of using an individually disposable filter element with each cup of brewed coffee.

Thus, in a sense, the present invention contemplates the provision of a brewing device which comprises a brew cup having a top opening and communicating at its bottom with a metered source of hot water, a cover member reciprocatable along a longitudinal path between a retracted position and an advanced position in registry with the brew cup, and having a perforate bottom wall and an overlying cavity communicating with a discharge spout, the brew cup being vertically movable into engagement with the advanced cover member, and a brush member located below the path of the cover member and projecting above the level of the underface of the perforate wall and located between the advanced and retracted positions of the cover member.

As applied to the brewing head of the machine described in the above-mentioned patent and which includes a pair of vertically longitudinally extending plates which define a mounting frame supporting the cover member, brew cup and sequential motivating assembly, there is provided a bracket which includes a pair of longitudinal strips extending along the confronting faces of the frame plates and separably secured thereto. The strips are joined by a cross piece which includes inwardly spaced arms having coupling slots formed therein. The brush includes a twisted wire core which supports helically arranged, radially projecting bristles, the wire being bent at right angles at one end. The ends of the core register with the coupling slots and the brush is resiliently raised upwardly toward the closed ends of the slots by spring legs carried by the bracket and releasably locking the brush in the bracket. During each stroke of the cover member between its retracted and advanced positions, the perforate bottom wall or screen is effectively cleaned to maintain the wall in an unclogged condition.

BRIEF DESCRIPTION OF THE DRAWINGS

FIG. 3 is a sectional view taken along line 3—3 of FIG. 2;

FIG. 4 is a fragmentary front elevational view of the brew cup, cover member, and brush, illustrating the advancing cover member engaged by the brush;

FIG. 5 is a view similar to FIG. 4 illustrating the cover in its advanced brew cup closing position;

FIG. 6 is a view similar to FIG. 3 but illustrating the brew cup in its depressed inverted ground discharge position;

FIG. 7 is a sectional view taken along line 7—7 of FIG. 3;

FIG. 8 is a perspective view of the brush and support bracket assembly;

FIG. 9 is an enlarged fragmentary perspective view of the bracket and brush in a separated condition; and FIG. 10 is a fragmentary enlarged longitudinal view of the brush and bracket in a coupled condition.

DESCRIPTION OF THE PREFERRED EMBODIMENT

Figure 1:
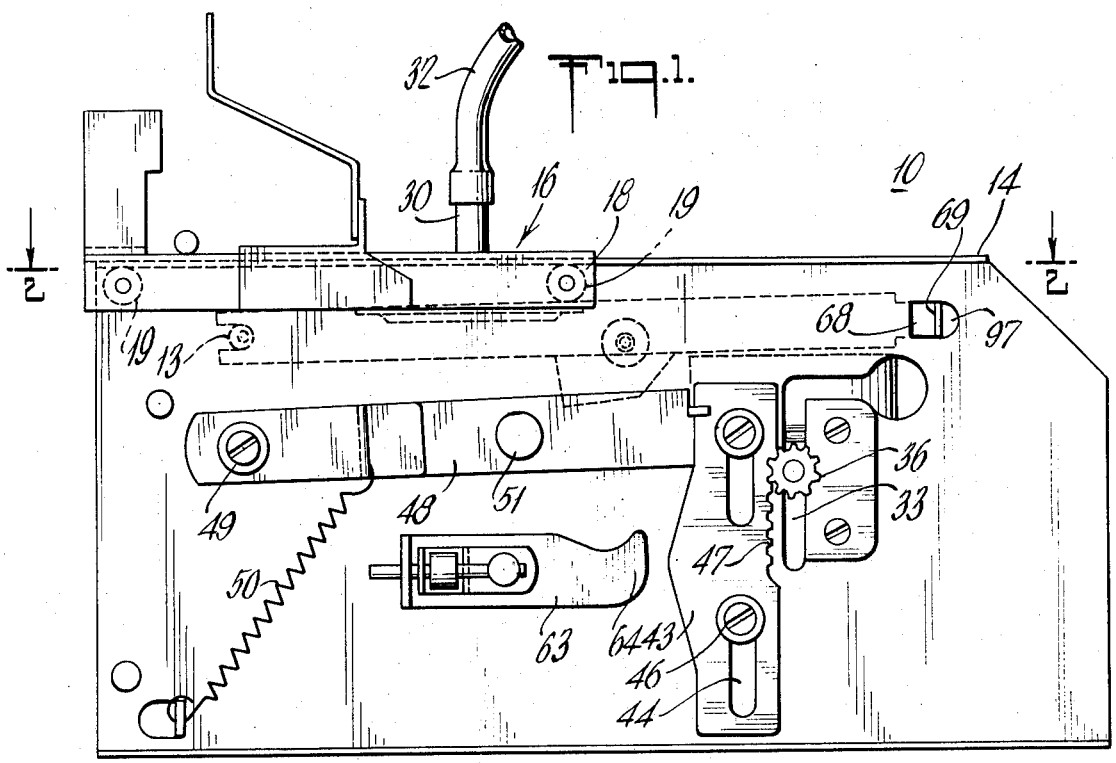
FIG. 1 is a side elevational view of a brewing head embodying the present invention.
Figure 2:
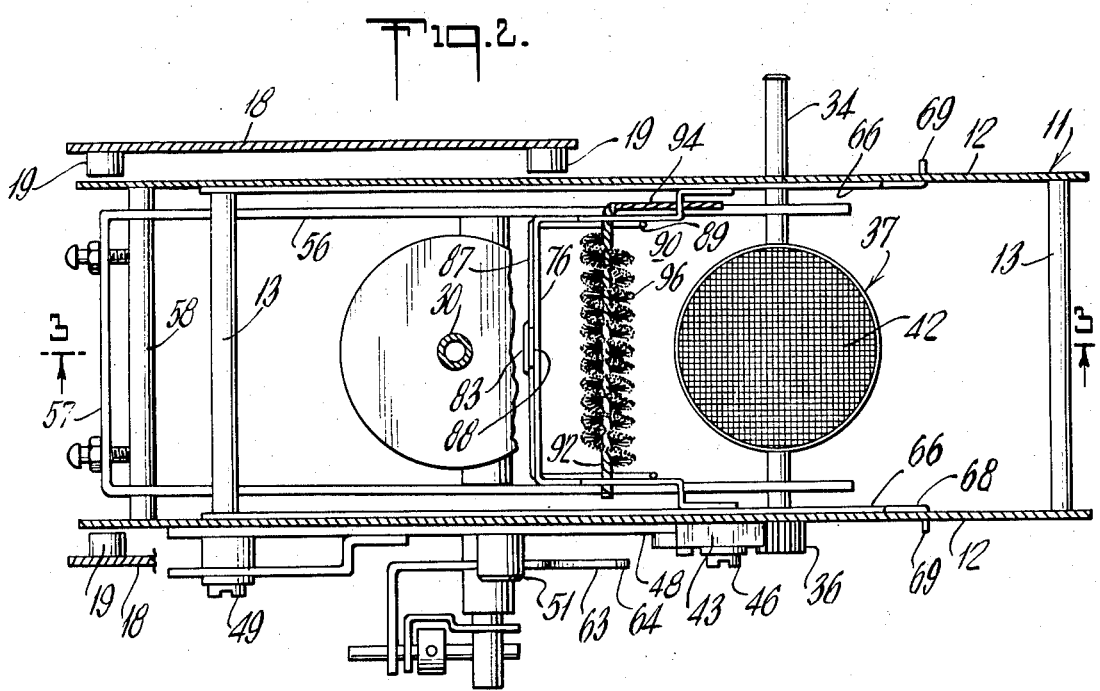
FIG. 2 is a section view taken along line 2—2 of FIG. 1.

Referring now to the drawings which illustrate a preferred embodiment of the present invention, reference numeral 10 generally designates the improved brewing head or assembly which, except for the construction of the brew cup cover member and the brush structure, is similar to that described in the above-identified patent and has similar sequencing, motivating, and other mechanisms associated therewith as set forth in the above patent, and the operations of the machines are likewise similar. Brew head 10 comprises a mounting frame 11 including a pair of longitudinally extending transversely spaced vertical plates 12 joined by crossrods 13 and provided along their upper edges with outwardly projecting track defining flanges 14.

A cover assembly 16 includes a transversely extending carriage plate 17 longitudinally slidably resting on flanges 14 and terminating in depending flanges 18, carrying inwardly directed rollers 19 which underlie the flanges 14 to restrain the vertical movement of assembly 16. The medial longitudinal section 20 of plate 17 is depressed below the level of flanges 14 and has separably secured to its underface proximate its right or forward end a cover member 21. Cover member 21 includes a circular top plate 22 directly underlying section 20 and secured thereto by a wing bolt 23 engaging plate 22 and a bracket 24 mounted atop section 20.

Affixed to the underface of plate 22 and coinciding therewith is a plate 23 terminating in a peripheral skirt wall 24. Also depending from plate 23 is a circular wall 26, coaxial with and extending below wall 25 and defining therewith an annular socket in which an elastomeric sealing annulus 27 nestles. The outer lower edge of annulus 26 is bevelled and a perforate wall-defining fine metal wire screen 28 extends across the bottom of annulus 26 and is secured to the bottom and outer bevelled edge thereof. Screen 28 and wall 22 delineate a chamber 29 which communicates with a vertical coupling pipe 30 extending through aligned axial openings in section 20 and circular walls 22 and 23 and engaged by a flexible hose 32 which extends to a discharge device.

A pair of opposite vertical slots 33 are formed in plates 12 and are vertically slidably engaged by a hollow shaft 34, hollow along one section thereof extending to the rear end of the shaft, and including a solid section at the opposite end of the shaft to which is affixed a gear 36 which slides along the outer face of bent frame plate 12. Mounted on shaft 34 and rotatable therewith is a brew cup 37 which includes a conical bottom section 37 with a wall converging to the shaft 34 and communicating with the hollow section of the shaft by way of a port 39 formed in the shaft hollow section. The upper part 40 of brew cup 37 is conical and open at its top, and is joined along its bottom edge to the upper edge of cup bottom section 38 by an inwardly directed peripheral flange 41 joining the bottom section conical wall by a peripheral wall depending from the inner edge of flange 41. A perforate wall 42 rests on and is secured to flange 41 and has openings therein smaller than the ground size of the coffee used. The top of the cup upper section 40 is open and its diameter is approximately equal to the median diameter of elastomeric annulus 27.

A slide member 43 having a pair of aligned vertical slots 44 is supported for limited vertical movement on the front face of frame front wall 12 by a pair of guide pin screws 46 registering with slots 44 and secured to front plate 12. Rack defining teeth 47 are formed along a predetermined length of the leading edge of slide member 43 and mesh with gear 36. A lever 48 is pivoted at its trailing end to front frame plate 13 by a pin 49 and is coupled at its leading end to the upper part of slide member 43 so as to be movable therewith. A helical tension spring 40 extending between a lug on lever 48 and a lug on front frame plate 12 spring biases lever 48 and slide member 43 downwardly. A forwardly projecting follower 51 is mounted on lever 48.

A transverse shaft 52 of hexagonal cross-section is journalled between frame plates 12 rearwardly and at the level of the bottoms of slots 33, and mechanically supports between its ends a sequencing and actuating cam 52. A yoke member 54 is disposed between frame plates 12 and includes a pair of parallel transversely spaced longitudinal arms 56 joined at their rears by a crossbar 57 which is suitable locked to a transverse axle journalled between the upper trailing corners of frame plates 12. A transverse circular follower bar 59 extends between yoke arms 56 between the ends thereof and is biased into engagement with the upper part of cam 53 by a tension spring 60 extending between at least one yoke arm 56 and a post at the lower trailing corner of frame 11. Longitudinal slots 61 framed at the free ends of yoke arms 56 engage shaft 34 so that said shaft 43 and brew cup 47 move up and down with the free ends of yoke arms 56.

Mounted in and rotatable with the free end of shaft 52, forward of front frame plate 12, is an arm 63 whose free end edge 64 is movable into and out of engagement with follower 51 with the rotation of shaft 52 and cam 53, the cam and shaft being so related that when the sharply depressed portion initially registers with follower 59 arm 63 engages follower 51 and shortly thereafter releases follower 51 when follower 59 registers with the deepest section of cam portion 65. The cover assembly 16 is advanced and retracted in timed relation (sequence) with the rotation of cam 53, as described in the above-identified patent.

The operation of the brewing head, except as hereinafter explained, is described in detail in the aforementioned patent. Briefly, with the rotation of cam 53 by a suitably controlled drive mechanism, cam 53 partially raises yoke 54 from the position shown in FIG. 6 to rotate brew cup 37 to an upright position shortly below its upright level, a charge of ground coffee is deposited in brew cup 37 and cover assembly 16 is advanced into vertical registry with said brew cup. The cup is then raised into sealed relationship with cover member 21 and brew water is fed through shaft 34, brew cup 37, cover 21 and thence to the brewed coffee delivery system. The brew cup is then slightly lowered and the cover assembly retracted. Cam portion 65 then advances into registry with follower 59 and arm 63 engages follower 51 and then advanced out of engagement with follower 51 to permit the spring-loaded arm to lower slide member 43, which rapidly inverts brew cup 37 and snaps it downwardly to discharge the spent coffee grounds.

According to the present invention, there is provided a brush assembly 65 which cleans the cover filter screen 38 during each brewing and dispensing cycle. Brush assembly 65 comprises a bracket 70 which includes a pair of transversely-spaced parallel longitudinal strips 66 having at their trailing ends coupling recesses 67 with arcuate bases, and at their leading ends longitudinally extending tongues 68 terminating in outwardly directed lugs 69. A transverse cross-piece 71 extends between strips 66 and includes a pair of opposite ears 72 secured to the confronting faces of strips 66, and terminating at their trailing ends in inwardly projecting legs 73, each of which joins at its inner end rearwardly converging arms 74 lying in vertical planes. A transverse cross-arm 76 joins the rear ends of arms 74 and is downwardly forwardly inclined and disposed below the level of strips 66.

An enlongated slot 77 is formed in the lower border of each leg 73. Each arm 74 has a coupling recess 78 formed therein which includes a substantially vertically extending slightly rearwardly upwardly inclined slot 79 closed at its upper end by an arcuate edge and is provided at its bottom with a rearwardly directed opening 80 which communicates by an upwardly rearwardly inclined passageway with the cut out upper rear corner 82 of each arm 74 which defines a funnel-shaped opening into passageway 81. Medially integrally formed with the upper border of cross-arm 76 is a transverse arm 83 disposed rearwardly of cross-arm 76. A pair of apertures 84 are formed in the upper corners of cross-arm 76.

A biasing and latching spring member 86 is formed of spring wire and includes a cross-arm 87 provided at its midpoint with an integrally formed U-shaped section 88 depending between arms 76 and 83. Directed forwardly and upwardly from the opposite ends of spring cross-arm 87 are inclined spring arms 89 which project through apertures 84 and extend along the inside faces of bracket arms 74, and in the spring-relaxed condition extend above the upper ends of arms 89. The depression of spring arms 89 is resiliently restrained by reason of spring section 88 being prevented from rocking by arm 83.

Releasably supported by bracket 70 is a brush member 90 which comprises a twisted wire core 91 including a main transverse section 92 of a length slightly less than the distance between strips 66, and forwardly directed parallel leg sections 94 at opposite ends thereof. Anchored to and engaged by the twisted wire core 91 in the known manner are radially outwardly projecting bristles 96 which are helically arranged about the core section 92 with the successive bristle convolutions being longitudinally spaced and separated. Bristles 96 are advantageously formed of a synthetic organic polymeric resin, such as oriented polypropylene, a polyester, or the like, and preferably nylon.

In applying brush 90 to bracket 70, spring arms 89 are depressed below the level of openings 80 by inserting core arm sections 94 into corresponding slots 77 and pressing brush 90 so that core section 92 lowers spring arms 89. When the openings 80 are exposed, the core section 92 is advanced into slot 79 and released so that spring arms 89 raise core section 92 in slot 79 above openings 80 and into engagement with the tops of slots 79 and resiliently upwardly biasing brush 90. To replace brush 90, it may be removed by pressing sufficiently downwardly on brush 90 to depress spring arms 89 and expose openings 80 so that core section 92 may be retracted through passageways 81.

In installing brush assembly 65 in brewer 10, cover assembly 16 is slid and separated from frame 11 after detaching the rear stop, the trailing ends of strips 66 are positioned between frame plates 12, strip recesses 67 are brought into engagement with the upper trailing cross-rod 13 and the leading ends of strips 66 are compressed and swung downwardly until ears 69 register with properly located openings 97 in the leading upper corners of frame plates 12. The strips are then released to bring ears 69 into engagement with openings 97 and the cover assembly is returned to engagement with frame 11. In the assembled condition of brew device 10, the upper periphery of brush bristles 96, in their fully raised position under the influence of spring arms 89, with core section 92 abutting the top of slots 79, are above the level of filter screen 28, preferably at about the level of the underface of sealing annulus 27. When the brush engages filter screen 28, spring arms 89 are not depressed below the level of the upper edge of opening 80.

The operation of brew device 10 is similar to that earlier described and, as set forth in the above-identified patent, except for the application of the filter paper. Moreover, as cover assembly is reciprocated during a brewing and dispensing cycle, cover carried filter screen 28 traverses a path in scraping engagement with brush bristles 96, both in its advance and retract stroke, to effect a thorough scrubbing and cleaning of the filter screen 28 to prevent the clogging thereof. When the brush is worn to a point of lessened effectiveness it is easily replaced in the manner described above.

While there has been described and illustrated a preferred embodiment of the present invention, it is apparent that numerous alterations and additions may be made without departing from the spirit thereof.

We claim:

1. A brewing device comprising a brew cup having a top opening and means providing liquid communication with said brew cup below said top opening, a cover member longitudinally movable between an advanced position in vertical registry with said brew cup and a retracted position remote from said brew cup and having a perforate bottom wall, and a brush member located below said cover member and projecting above the underface of said perforate wall and extending for the width thereof and disposed between the retracted and advanced positions of said cover member.

2. A brewing device as in claim 1, wherein said perforate bottom wall comprises a woven metal wire filter screen.

3. A brewing device as in claim 1, wherein said brush member is vertically movable and including means upwardly resiliently biasing said brush.

4. A brewing device as in claim 1, wherein said brush comprises a transversely extending core and bristles projecting outwardly from said core and extending in a helical path about said core.

5. A brewing device as in claim 4, wherein said core comprises a pair of twisted metal wires engaging said bristles and said bristles are formed of a synthetic organic polymeric resin.

6. A brewing device as in claim 1, comprising a support frame including a pair of transversely spaced, longitudinally extending tracks supporting said cover member for movement between said advanced and retracted positions, means mounted on said support frame for vertically moving said brew cup between a depressed inverted position and a raised upright position in engagement with said cover member when in its advanced position and a bracket member mounted on said frame and supporting said brush member.

7. A brewing device as in claim 6, wherein said brush member comprises a transversely extending core and outwardly projecting bristles, said brush member being separably supported by said bracket member.

8. The brewing device of claim 7, wherein said bristles are formed of nylon.

9. A brewing device as in claim 6, wherein said bracket member is separably secured to said frame member.

10. A brewing device as in claim 9, wherein said support frame comprises a pair of opposing transversely spaced, longitudinally extending vertical plates, said tracks being along the upper parts of said plates, and said bracket member comprises a pair of longitudinally extending strips releasably engaging the confronting faces of said plates, and a cross-piece connected to and extending between said strips, said brush being separably supported by said cross-piece.

11. A brewing device as in claim 10, wherein said cross-piece comprises a pair of opposite outer legs extending transversely to said strips, a pair of arms projecting longitudinally from the inner ends of said legs, and a transverse cross-arm joining the ends of said longitudinal arms remote from said legs, said longitudinal arms having recesses formed therein releasably engaging said brush core.

12. The brewing device of claim 11, wherein each of said recesses includes a vertically extending slot closed at the top thereof and vertically slidably engaging opposite end sections of said brush core, and spring elements engaging the underface of said core proximate said recesses and resiliently urging said core toward engagement with the upper ends of said slots.

13. The brewing device of claim 12, wherein each of said slots has an opening in the lower side thereof, said spring elements normally closing said openings and being depressible to below the level of the tops of said openings to provide access to said slots through said openings.

* * * * *